(12) United States Patent
Adamczak et al.

(10) Patent No.: US 12,372,126 B2
(45) Date of Patent: Jul. 29, 2025

(54) LIMITATION OF A MACHINE BY A SYSTEM FOR CAPTURING BRAKING PARTICLES

(71) Applicant: TALLANO TECHNOLOGIE, Boulogne Billancourt (FR)

(72) Inventors: Loic Adamczak, Boulogne Billancourt (FR); Christophe Rocca-Serra, Paris (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 441 days.

(21) Appl. No.: 17/802,502

(22) PCT Filed: Feb. 24, 2021

(86) PCT No.: PCT/EP2021/054611
§ 371 (c)(1),
(2) Date: Aug. 25, 2022

(87) PCT Pub. No.: WO2021/170681
PCT Pub. Date: Sep. 2, 2021

(65) Prior Publication Data
US 2023/0094343 A1    Mar. 30, 2023

(30) Foreign Application Priority Data
Feb. 28, 2020 (FR) ...................... 2002025

(51) Int. Cl.
*F16D 65/00* (2006.01)
*B60T 17/22* (2006.01)
*B60W 30/18* (2012.01)

(52) U.S. Cl.
CPC .......... *F16D 65/0031* (2013.01); *B60T 17/22* (2013.01); *B60W 30/18009* (2013.01)

(58) Field of Classification Search
CPC .... B60T 17/221; B60T 17/22; F16D 65/0031; B60W 30/18009; B60Y 2306/15; F15B 21/041
See application file for complete search history.

(56) References Cited

U.S. PATENT DOCUMENTS

| 2014/0262633 A1 | 9/2014 | Kunzler et al. |
| 2015/0233436 A1 | 8/2015 | Rocca-Serra |

(Continued)

FOREIGN PATENT DOCUMENTS

| FR | 3 057 040 | 4/2018 |
| FR | 3 081 781 | 12/2019 |

(Continued)

OTHER PUBLICATIONS

International Search Report for PCT/EP2021/054611 dated Mar. 26, 2021, 6 pages.

(Continued)

*Primary Examiner* — Pamela Rodriguez
(74) *Attorney, Agent, or Firm* — NIXON & VANDERHYE

(57) ABSTRACT

Disclosed is a system for capturing braking particles from a friction brake system of a machine, which includes a vacuum source, a pneumatic circuit which connects the friction brake system to the vacuum source, and a filter located on the pneumatic circuit and mounted on a support. The capturing system includes a control unit, a control device for the machine, and a clogging detection device for the filter which is capable of sending at least one signal to the control unit when the filter is clogged, the control unit being capable of determining the clogging of the filter, on the basis of this signal, and being capable of determining whether the detection device is inoperative, the control unit being capable of activating the control device to limit the (Continued)

operation of the machine when the filter is clogged or when the detection device is inoperative.

14 Claims, 1 Drawing Sheet

(56) References Cited

U.S. PATENT DOCUMENTS

| | | | |
|---|---|---|---|
| 2020/0049213 A1* | 2/2020 | Rocca-Serra | ......... F16D 65/092 |
| 2020/0355230 A1 | 11/2020 | Arnault et al. | |
| 2021/0239168 A1* | 8/2021 | Adamczak | .............. F16D 69/00 |

FOREIGN PATENT DOCUMENTS

| | | |
|---|---|---|
| GB | 2538735 | 11/2016 |
| RU | 2 644 037 C2 | 2/2018 |
| WO | 2019/086814 A1 | 5/2019 |
| WO | 2019/224034 | 11/2019 |

OTHER PUBLICATIONS

Written Opinion of the ISA for PCT/EP2021/054611 dated Mar. 26, 2021, 5 pages.
Search Report issued in Russian Patent Application No. 2022123804 dated Dec. 6, 2022.

* cited by examiner

[Fig. 1]
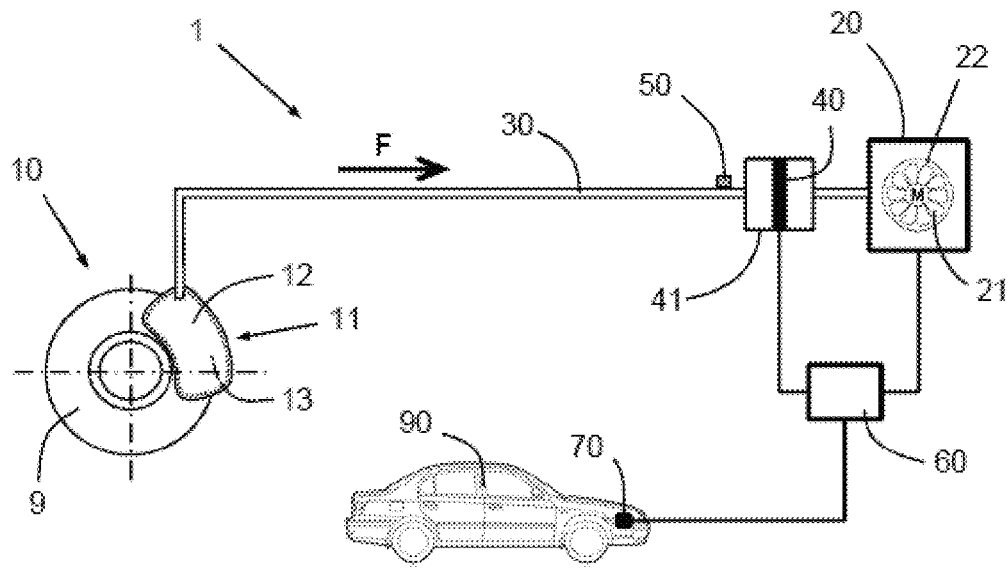
[Fig. 2]
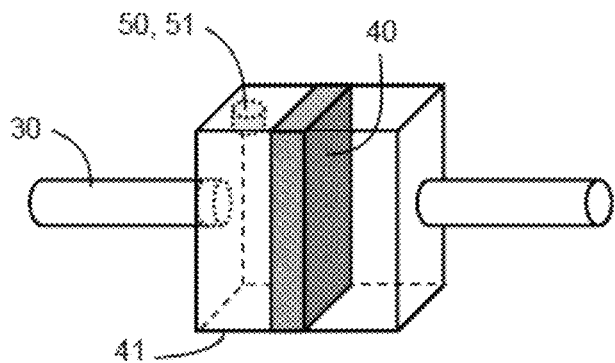
[Fig. 3]
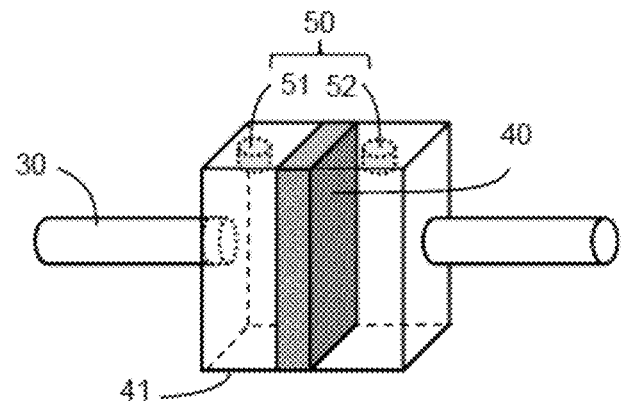

LIMITATION OF A MACHINE BY A SYSTEM FOR CAPTURING BRAKING PARTICLES

CROSS-REFERENCE TO RELATED APPLICATIONS

This application is the U.S. national phase of International Application No. PCT/EP2021/054611 filed Feb. 24, 2021 which designated the U.S. and claims priority to French Patent Application No. 2002025 filed Feb. 28, 2020, the entire contents of each of which are hereby incorporated by reference.

BACKGROUND OF THE INVENTION

Field of the Invention

This invention relates to a system for capturing braking particles from a friction brake system of a machine, which comprises a vacuum source, a pneumatic circuit which connects the friction brake system to the vacuum source, and a filter located on the pneumatic circuit and mounted on a support.

Description of the Related Art

Such friction brake systems may equip road or rail vehicles. Such friction brake systems may also equip stationary rotor devices such as wind turbines or industrial machines.

In such systems, there is provided a vacuum source (for example a suction turbine driven by a motor) which is connected by a pneumatic circuit to the friction brake system, and a filter for collecting particles emitted by the brake system. This filter is placed upstream of the vacuum source, and prevents the passage of particles through the vacuum source and their release into the atmosphere. However, in certain situations, this filter is clogged beyond a predefined acceptable threshold, or the filter clogging detection system does not work, for example because it is disconnected, deliberately or inadvertently. The operation of the machine is inefficient in these situations.

SUMMARY OF THE INVENTION

The invention aims to remedy these disadvantages.

The aim of the invention is to propose a system for capturing braking particles which makes it possible to limit the operation of the vehicle, or of the stationary device, when the filter is clogged or when the filter clogging detection system does not work.

This object is achieved due to the fact that the capturing system comprises a control unit, a control device for the machine, and a clogging detection device for the filter which is capable of sending at least one signal to the control unit when the filter is clogged, the control unit being capable of determining the clogging of the filter, on the basis of this signal, and being capable of determining whether the detection device is inoperative, the control unit being capable of activating the control device to limit the operation of the machine when the filter is clogged or when the detection device is inoperative, and being capable of informing a user of the clogging of the filter.

Due to these arrangements, a clogging of the filter on the pneumatic circuit is detected and determined, and in this case the operation of the machine is limited. In addition, the control unit is able to determine if the clogging detection device is inoperative, and to limit the operation of the machine in this case as well.

Advantageously, the user is informed by the control unit of the clogging of the filter or of the malfunction of the detection device.

Advantageously, the detection device comprises a pressure sensor which is located on the pneumatic circuit upstream of the filter, the detection device being capable of sending in a signal to the control unit a measurement of the pressure $P_1$ in the pneumatic circuit upstream of the filter, the control unit, upon receiving this signal, being capable of comparing the measured pressure $P^1$ with a reference pressure $P_R$ which is the pressure in the pneumatic circuit for a determined clogging threshold of the filter for the reference operating state $E_R$ of the vacuum source during the measurement of pressure $P_1$ by the pressure sensor, the control unit being capable of limiting the operation of the machine when the measured pressure $P_1$ is substantially equal to or greater than the reference pressure $P_R$.

Clogging of the filter is thus reliably determined.

Alternatively, the detection device comprises a first pressure sensor which is located on the pneumatic circuit upstream of the filter, the detection device being capable of sending in a signal to the control unit a measurement of the first pressure $P_1$ in the pneumatic circuit upstream of the filter, and a second pressure sensor which is located on the pneumatic circuit downstream of the filter, the detection device being capable of sending in a signal to the control unit a measurement of the second pressure $P_2$ in the pneumatic circuit downstream of the filter, the control unit, upon receiving the at least one signal, being capable of comparing the first measured pressure $P_1$ and the second measured pressure $P_2$, the control unit being capable of limiting the operation of the machine when the difference $(P_1-P_2)$ between the first measured pressure $P_1$ and the second measured pressure $P_2$ is substantially equal to or greater than a threshold pressure difference $\Delta P$ which corresponds to a determined clogging threshold of the filter.

Clogging of the filter is thus reliably determined.

The invention also relates to a machine comprising a capturing system according to the invention.

The invention also relates to a method for detecting the clogging of a filter in a system for capturing braking particles from a friction brake system of a machine, this capturing system comprising a vacuum source, a pneumatic circuit which connects the friction brake system to the vacuum source, and a filter located on the pneumatic circuit and mounted on a support.

According to the invention, the method comprises the following steps:

(a) A control unit, a control device for the machine, and a clogging detection device for the filter are provided, which are part of the capturing system;

(b) The control unit determines if the detection device is inoperative;

(c) The detection device sends at least one signal to the control unit when the filter is clogged, if the detection device is operational;

(d) The control unit determines whether the filter is clogged, on the basis of the signal;

(e) The control unit activates the control device to limit the operation of the machine when the filter is clogged or when the detection device is inoperative.

Advantageously, the method further includes the following step:

(f) The control unit notifies a user of the clogging of the filter or of the malfunction of the detection device.

BRIEF DESCRIPTION OF THE DRAWINGS

The invention will be better understood and its advantages will be more apparent upon reading the following detailed description of some embodiments represented by way of non-limiting examples. The description refers to the accompanying drawings, in which:

FIG. 1 is a schematic view of a capturing system according to the invention,

FIG. 2 is a perspective view of a housing carrying a filter, and of a clogging detection device for this filter in the capturing system of FIG. 1, FIG. 3 is a perspective view of a housing carrying a filter, and of an alternative clogging detection device for this filter in the capturing system of FIG. 1.

DESCRIPTION OF THE PREFERRED EMBODIMENTS

FIG. 1 schematically shows a system 1 for capturing particles according to the invention, these particles being emitted by a friction brake system 10.

This friction brake system 10 comprises a brake pad 11 for braking a machine 90. This machine is either a vehicle or a stationary device. This pad 11 comprises a backing plate 12 and a lining 13 made of friction material fixed to the backing plate 12. In FIG. 1, the pad 11 is viewed from underneath, the backing plate 12 being in the foreground.

The pad 11 (first pad) is facing a disc 9 which is driven in rotation by the machine 90, for example by the wheel of the vehicle when this machine is a vehicle. A second identical pad (not visible) is located on the other side of the disc 9 and opposite the first pad 11 so that these two pads sandwich the disc 9. The braking of the disc 9 is achieved by friction of the two linings (13) against the disc 9 when these two pads approach the disc 9.

The capturing system 1 comprises a pneumatic circuit 30 and a vacuum source 20. The pad 11 and the second pad are connected to the vacuum source 20 via this pneumatic circuit 30. For example, the vacuum source 20 comprises an electric motor 21 and a suction turbine 22 which is driven by this electric motor 21.

In operation, the vacuum source 20 is capable of suctioning in the particles upon their emission by the linings (13), through the pneumatic circuit 30. The direction of circulation of the air and particles during normal operation is indicated by the arrow F in FIG. 1. The arrow F therefore indicates a flow from upstream to downstream. The capturing system 1 further comprises a filter 40 which is located on the circuit 30, meaning that the air which circulates within the circuit 30 passes through the filter. This filter 40 is mounted on a support 41 which is fixed to the pipe 30. For example, the support 41 is a housing which houses the filter 40 therein, as shown in the figures. The filter 40 thus separates the housing 41 into an upstream portion and a downstream portion. The air coming from the upstream portion of the circuit 30 enters the housing 41 at the upstream end of the housing 41, passes through the filter 40, and exits the housing 41 at the downstream end of the housing 41 to enter the downstream portion of the circuit 30.

The capturing system 1 further comprises a control unit 60, a control device 70 for the machine 90, and a detection device 50 for the filter 40. This control unit 60 and this detection device 50 are used to determine a clogging of the filter 40 beyond a certain clogging threshold. The control unit 60 receives signals from the detection device 50 (which comprises an element for generating and sending these signals), and is also capable of controlling the vacuum source 20 and receiving information therefrom, and controlling the control device 70 for the machine 90. These interactions between the control unit 60, the control device 70, the detection device 50, and the vacuum source 20 are represented schematically in FIG. 1 by solid lines. These interactions may be implemented by electric lines. The operation of this control unit 60, the control device 70, and this detection device 50 is described below.

During operation of the capturing system 1, the detection device 50 sends at least one signal to the control unit 60 if the detection device 50 is operational. "At least one signal" is understood to mean the sending of either a continuous signal or a signal at regular intervals. This signal contains information which directly or indirectly concerns the clogging of the filter 40, i.e. a level of effective clogging of the filter 40. It is considered that the filter 40 is effectively clogged when the filter 40 is clogged beyond a certain clogging threshold, this threshold being predefined. The control unit 60 determines a clogging of the filter 40 on the basis of this signal, by comparing the level of effective clogging of the filter 40 and the predefined clogging threshold.

It is also possible that the detection device 50 is inoperative (operation malfunction). This is the case for example because it is defective, or because it is disconnected, deliberately or inadvertently. In this situation, the detection device 50 is not capable of detecting the clogging of the filter 40, and is not able to send a signal to the control unit 60. This absence of sending the signal occurs either as an interruption of the signal when this signal is continuous, or by an absence of sending the signal at a time when it should have been sent, when this signal is periodic. Thus, an operating malfunction of the detection device 50 is determined by the control unit 60 based on the fact that the control unit 60 is no longer receiving a signal from the detection device 50.

In the above two cases (case of clogging of the filter 40 beyond a certain clogging threshold, and case of an inoperative detection device 50), the control unit activates the control device 70 of the machine 90 to limit the operation of the machine 90, for example limiting the speed of rotation of a disk on which the friction brake system 10 is mounted. In the case where the machine 90 is a vehicle, this limitation is a limitation of the vehicle's speed of movement. If the machine 90 is stationary, this operation limitation may be preventing the machine 90 from starting. In the case where the machine 90 is a vehicle, the vehicle then remains stationary.

According to one embodiment, the control unit 60 informs a user of the clogging of the filter 40 (or of the operation malfunction of the control device 70). This information may be provided by any means, for example by displaying text on the dashboard of the vehicle such as "Filter clogged", "Filter detection inoperative", or a logo or an indicator light, and/or for example by stimulation of the user by vibrations via a vibratory system located in the seat and controlled by the control unit 60.

An embodiment of the detection device 50 for the filter 40 is described below, with reference to FIG. 2. FIG. 2 is a more detailed view of the support 41, filter 40, and detection device 50.

The detection device 50 comprises a (first) pressure sensor 51 which is located on the pneumatic circuit 30, upstream of the filter 40. Ideally, the pressure sensor 51 is located sufficiently close to the filter 40 so that the pressure measured by the pressure sensor 51 is identical to the pressure at the location where the filter 40 is, or where it would be if it were present. Thus, the pressure sensor 51 is located either on the pneumatic circuit 30 close to the support 41 of the filter 40, or in the support 41 of the filter 40 as represented in FIG. 2. "Located in the support 41" is understood to mean that the pressure sensor is located on the support, or in the support if this support is a housing, and in all cases this sensor measures the pressure at the location of this support 41.

The pressure sensor 51 is capable of measuring the (first) pressure $P_1$ in the pneumatic circuit 30 upstream of the filter 40, and the detection device 50 is capable of sending this measurement in a signal to the control unit 60. During this measurement, the vacuum source 20 operates in an operating state called the reference operating state $E_R$. This operating state is characterized by a parameter which is for example the speed of rotation V of the suction turbine 22. Thus, in the reference operating state $E_R$, the suction turbine 22 rotates at a speed of rotation VR. The control unit 60 has a reference pressure $P_R$ in memory, which is the pressure generated in the pneumatic circuit 30 for a determined clogging threshold of the filter 40 for the reference operating state $E_R$ of the vacuum source 20. It is understood that this reference pressure $P_R$ varies as a function of this reference operating state $E_R$. Thus, the reference pressure $P_R$ varies as a function of the speed of rotation VR of the turbine 22. The control unit 60, upon receiving the signal comprising the pressure $P_1$ measured in the pneumatic circuit 30, compares this measured pressure $P_1$ with the reference pressure $P_R$. This reference pressure $P_R$ corresponds to the pressure in the pneumatic circuit 30 for a determined clogging threshold of the filter 40 for the reference operating state $E_R$ of the vacuum source 20, and the measurement of the first pressure $P_1$ by the pressure sensor 51 is performed during this reference operating state $E_R$. Consequently, if the first pressure $P_1$ is substantially equal to or is greater than the reference pressure $P_R$, this means that the filter 40 is clogged above the clogging threshold. "Substantially equal" is understood to mean that the pressure is within a restricted interval around the reference pressure. For example, this interval is +/−1%, or +/−2%, or +/−5%, or +/−10% of the reference pressure value. Thus, in the situation where $P_1$ is substantially equal to or greater than $P_R$, the control unit 60 limits the operation of the machine 90.

A variant of this embodiment is described below, in which the detection device 50 comprises a second pressure sensor 52 in addition to the first pressure sensor 51. This variant is illustrated in FIG. 3. The first pressure sensor 51 is located upstream of the filter 40, on the circuit 30. The second pressure sensor 52 is located downstream of the filter 40, on the circuit 30. For example, the first sensor 51 and second sensor 52 are located in the support 41, as illustrated in FIG. 3. The first pressure sensor 51 is capable of measuring a first pressure $P_1$ in the pneumatic circuit 30 upstream of the filter 40, and the detection device 50 is capable of sending this measurement in a signal to the control unit 60. In parallel, for example simultaneously, the second pressure sensor 52 is capable of measuring a second pressure $P_2$ in the pneumatic circuit 30 downstream of the filter 40, and the detection device 50 is capable of sending this measurement in a signal to the control unit 60. For example, the measurement of the first pressure $P_1$ and the measurement of the second pressure $P_2$ are sent in the same signal. The control unit 60, upon receiving this or these signals, is capable of comparing the first pressure $P_1$ with the second pressure $P_2$. If the difference $(P_1-P_2)$ between the first measured pressure $P_1$ and the second measured pressure $P_2$ is substantially equal to or is greater than a threshold pressure difference $\Delta P$, this means that the filter 40 is clogged above the clogging threshold. The control unit 60 has in memory this threshold pressure difference $\Delta P$, which is valid for the operating state of the vacuum source 20 during the measurements of the first pressure $P_1$ and second pressure $P_2$. Thus, in the situation where $(P_1-P_2)$ is substantially equal to or greater than $\Delta P$, the control unit 60 limits the operation of the machine 90.

The above embodiment and its variant may be combined. Thus, the control unit is capable of both comparing $(P_1-P_2)$ with $\Delta P$ and comparing $P_1$ with $P_R$.

The invention also relates to a machine comprising a capturing system 1 as described above.

The invention also relates to a method for detecting the clogging of a filter 40 in a system 1 for capturing braking particles from a friction brake system 10 of a machine 90. As described above, this capturing system 1 comprises a vacuum source 20, a pneumatic circuit 30 which connects the friction brake system 10 to the vacuum source 20, and a filter 40 which is located on the pneumatic circuit 30 and which is mounted on a support 41. The method comprises the following steps:

(a) A control unit 60, a control device 70 for the machine 90, and a detection device 50 for the filter 40 are provided, which are part of the capturing system 1;

(b) The control unit 60 determines if the detection device 50 is inoperative;

(c) The detection device 50 sends at least one signal to the control unit 60 when the filter 40 is clogged, if the detection device 50 is operational;

(d) The control unit 60 determines whether the filter 40 is clogged, on the basis of the signal;

(e) The control unit 60 activates the control device 70 to limit the operation of the machine 90 when the filter 40 is clogged or when the detection device 50 is inoperative.

In addition, the method includes step (f) below, which immediately precedes or follows step (e):

(f) The control unit 60 notifies a user of the clogging of the filter 40 or of the malfunction of the detection device 50.

The invention claimed is:

1. A system for capturing braking particles from a friction brake system of a machine, which comprises a vacuum source, a pneumatic circuit which connects said friction brake system to said vacuum source, a filter located on said pneumatic circuit and mounted on a support, wherein said capturing system comprises a control unit, a control device for said machine, and a clogging detection device for said filter which is capable of sending at least one signal to said control unit when the filter is clogged, said control unit being capable of determining the clogging of said filter, on the basis of this signal, and being capable of determining whether said detection device is inoperative, said control unit being capable of activating said control device to limit the operation of the machine when said filter is clogged or when said detection device is inoperative.

2. The capturing system according to claim 1, wherein the control unit is capable of informing a user of the clogging of the filter or of the malfunction of the detection device.

3. The capturing system according to claim 2, wherein said detection device comprises a pressure sensor which is located on said pneumatic circuit upstream of said filter, said detection device being capable of sending in a signal to said control unit a measurement of the pressure ($P_1$) in said pneumatic circuit upstream of said filter, said control unit, upon receiving said signal, being capable of comparing said measured pressure ($P_1$) with a reference pressure ($P_R$) which is the pressure in said pneumatic circuit for a determined clogging threshold of said filter for a reference operating state ($E_R$) of said vacuum source during said measurement of pressure ($P_1$) by said pressure sensor, said control unit being capable of limiting the operation of the machine when said measured pressure ($P_1$) is substantially equal to or greater than said reference pressure ($P_R$).

4. A machine comprising the capturing system according to claim 3.

5. The capturing system according to claim 2, wherein said detection device comprises a first pressure sensor which is located on said pneumatic circuit upstream of said filter, said detection device being capable of sending in a signal to said control unit a measurement of a first pressure ($P_1$) in said pneumatic circuit upstream of said filter, and a second sensor pressure which is located on said pneumatic circuit downstream of said filter, said detection device being capable of sending in a signal to said control unit a measurement of a second pressure ($P_2$) in said pneumatic circuit downstream of said filter, said control unit, upon receiving said at least one signal, being capable of comparing said first measured pressure ($P_1$) and said second measured pressure ($P_2$), said control unit being capable of limiting the operation of the machine when the difference between said first measured pressure ($P_1$) and said second measured pressure ($P_2$) is substantially equal to or greater than a threshold pressure difference ($\Delta P$) which corresponds to a determined clogging threshold of said filter.

6. A machine comprising the capturing system according to claim 5.

7. A machine comprising the capturing system according to claim 2.

8. The capturing system according to claim 1, wherein said detection device comprises a pressure sensor which is located on said pneumatic circuit upstream of said filter, said detection device being capable of sending in a signal to said control unit a measurement of the pressure ($P_1$) in said pneumatic circuit upstream of said filter, said control unit, upon receiving said signal, being capable of comparing said measured pressure ($P_1$) with a reference pressure ($P_R$) which is the pressure in said pneumatic circuit for a determined clogging threshold of said filter for a reference operating state ($E_R$) of said vacuum source during said measurement of pressure ($P_1$) by said pressure sensor, said control unit being capable of limiting the operation of the machine when said measured pressure ($P_1$) is substantially equal to or greater than said reference pressure ($P_R$).

9. A machine comprising the capturing system according to claim 8.

10. The capturing system according to claim 1, wherein said detection device comprises a first pressure sensor which is located on said pneumatic circuit upstream of said filter, said detection device being capable of sending in a signal to said control unit a measurement of a first pressure ($P_1$) in said pneumatic circuit upstream of said filter, and a second sensor pressure which is located on said pneumatic circuit downstream of said filter, said detection device being capable of sending in a signal to said control unit a measurement of a second pressure ($P_2$) in said pneumatic circuit downstream of said filter, said control unit, upon receiving said at least one signal, being capable of comparing said first measured pressure ($P_1$) and said second measured pressure ($P_2$), said control unit being capable of limiting the operation of the machine when the difference between said first measured pressure ($P_1$) and said second measured pressure ($P_2$) is substantially equal to or greater than a threshold pressure difference ($\Delta P$) which corresponds to a determined clogging threshold of said filter.

11. A machine comprising the capturing system according to claim 10.

12. A machine comprising the capturing system according to claim 1.

13. A method for detecting clogging of a filter in a system for capturing braking particles from a friction brake system of a machine, this capturing system comprising a vacuum source, a pneumatic circuit which connects said friction brake system to said vacuum source, and a filter located on said pneumatic circuit and mounted on a support, said method comprising:
   (a) providing a control unit, a control device for said machine, and a clogging detection device for said filter, which are part of said capturing system;
   (b) determining, by said control unit, if said detection device is inoperative;
   (c) sending, by said detection device, at least one signal to said control unit when the filter is clogged, if the detection device is operational;
   (d) determining, by said control unit, whether said filter is clogged, on the basis of said signal; and
   (e) activating, by said control unit, said control device to limit the operation of the machine when said filter is clogged or when said detection device is inoperative.

14. The detection method according to claim 13, further comprising:
   (f) notifying, by said control unit, a user of the clogging of the filter or of the malfunction of the detection device.

* * * * *